United States Patent
Katayama et al.

(10) Patent No.: US 8,246,110 B2
(45) Date of Patent: Aug. 21, 2012

(54) DEFLECTOR MECHANISM FOR SUNROOF APPARATUS

(75) Inventors: Hajime Katayama, Sakura (JP); Ayumi Mihashi, Sakura (JP)

(73) Assignee: Yachiyo Industry Co., Ltd., Sayama-shi (JP)

( * ) Notice: Subject to any disclaimer, the term of this patent is extended or adjusted under 35 U.S.C. 154(b) by 0 days.

(21) Appl. No.: 13/030,556

(22) Filed: Feb. 18, 2011

(65) Prior Publication Data

US 2011/0198892 A1    Aug. 18, 2011

(30) Foreign Application Priority Data

Feb. 18, 2010   (JP) .................................. 2010-033135

(51) Int. Cl.
*B60J 7/22*      (2006.01)
*B60J 7/043*     (2006.01)
(52) U.S. Cl. ........................................ 296/217; 296/214
(58) Field of Classification Search .................. 296/217, 296/214

See application file for complete search history.

(56) References Cited

U.S. PATENT DOCUMENTS 5,971,472 A * 10/1999 Schreiter et al. .............. 296/217

FOREIGN PATENT DOCUMENTS

JP      2008-247093      10/2008

* cited by examiner

*Primary Examiner* — Dennis Pedder
(74) *Attorney, Agent, or Firm* — Rankin, Hill & Clark LLP

(57) ABSTRACT

There is provided a deflector mechanism for a sunroof apparatus which can reduce the number of parts, assembling processes, and a production cost. The sunroof apparatus includes a pair of guide rails provided at both sides of an opening formed in a roof of a vehicle in a widthwise direction, a sunroof panel which slides along the guide rails, a resin-made front frame which interconnects front ends of the guide rails, and a deflector mechanism which ascends/descends along a front edge of the opening of the vehicle. The deflector mechanism includes a deflector including a pair of arms and a blade that connects these arms together, a pair of support members each of which supports a basal end of each arms, a retainer formed at a front frame, and an urging means which urges the deflector upwardly, and the retainer is formed together with the front frame.

4 Claims, 7 Drawing Sheets

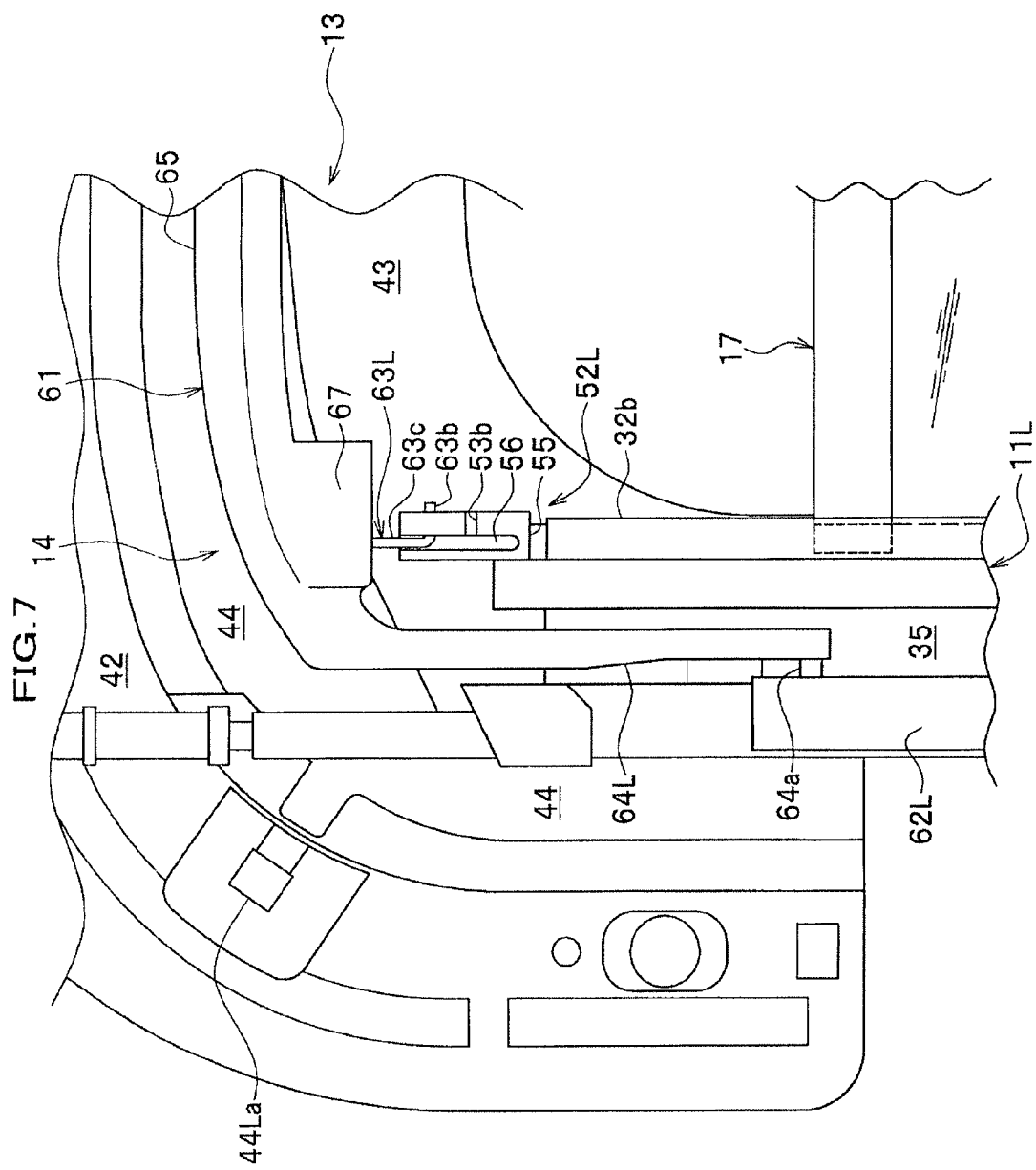

US 8,246,110 B2

DEFLECTOR MECHANISM FOR SUNROOF APPARATUS

CROSS REFERENCE TO RELATED APPLICATIONS

The present application claims benefit of the filing date of Japanese Patent Application No. 2010-033135 filed on Feb. 18, 2010, the disclosure of which is incorporated herein by reference.

BACKGROUND OF THE INVENTION

1. Field of the Invention

The present invention relates to a deflector mechanism which is mounted on a sunroof apparatus in a vehicle.

2. Description of the Related Art

An example of a sunroof apparatus provided at the opening of a roof of a vehicle is a configuration disclosed in Japan Patent No. 4313399. The sunroof apparatus disclosed in Japan Patent No. 4313399 mainly comprises a pair of guide rails, a frame which interconnects the front ends of the guide rails, a sunroof panel which moves along the guide rails, a driving device which moves the sunroof panel, a cable which links the driving device with the sunroof panel, and a deflector mechanism formed at the front edge of the opening of the roof in an ascendable/descendible manner. The deflector mechanism is provided in order to suppress a low-frequency uncomfortable vibration sound which is referred to as a wind throb and which is generated when a vehicle runs with the sunroof panel being opened.

The deflector mechanism according to Japan Patent No. 4313399 has, as shown in FIG. 4 of this publication, a deflector having a pair of arms and a blade (a deflecting plate) that connects these arms together, a pair of support members which are formed at respective guide rails and which support the basal ends of the arms through pins, a retainer attached to the frame, and urging means (coil springs) which are provided across the deflector and respective retainers and which urge the deflector upwardly.

Since the deflector mechanism disclosed in Japan Patent No. 4313399 is a separate member from the frame and the retainer, and the retainer is fixed to the frame by means of a bolt and a nut, the number of components increases, the assembling step becomes complex, and the production cost increases.

The present invention is made in order to overcome such a problem, and it is an object of the present invention to provide a deflector mechanism for a sunroof apparatus which can reduce the number of parts, assembling processes, and further the production cost.

SUMMARY OF THE INVENTION

In order to overcome the above problem, a first aspect of the present invention provides a deflector mechanism for a sunroof apparatus that comprises: a pair of guide rails provided at both sides of an opening formed in a roof of a vehicle in a widthwise direction; a sunroof panel which slides back and forth along the pair of guide rails; a resin-made front frame which interconnects respective front ends of the guide rails; and the deflector mechanism which ascends/descends along a front edge of the opening of the vehicle, in which the deflector mechanism comprises: a deflector including a pair of arms and a blade that connects the arms together; a pair of support members each of which is formed at each guide rail and which supports a basal end of each arm; a retainer formed on the front frame; and an urging means which is provided across the deflector and the retainer and which urges the deflector upwardly, and the retainer is formed integrally with the front frame.

According to this configuration, the number of parts can be reduced because the retainer is formed together with the resin-made front frame. It is also possible to eliminate a step of fixing the retainer with the front frame which is necessary in the prior art because the retainer is formed together with the resin-made front frame. This enables reduction of a production cost.

Also, a second aspect of the present invention provides the sunroof apparatus deflector mechanism of the first aspect of the present invention, in which a rear end of the retainer is arranged so as to face the front end of a groove of the guide rail.

According to this configuration, for example, when the guide rail is provided with the groove which allows a sunshade panel to slide over the guide rail, because the rear end of the retainer faces the front end of the groove, the retainer can serve as a stopper for the sunshade panel. Because the retainer has both functions as the fastener and the stopper, it becomes possible to further reduce the number of parts, etc.

Also, a third aspect of the present invention provides the sunroof apparatus deflector mechanism of the second aspect of the present invention, in which the retainer is formed on a rear tabular portion of the front frame, and it is desirable that the front end of the guide rail is inserted into a space formed between the rear end of the retainer and the rear tabular portion of the front frame.

According to this configuration, when the guide rail and the front frame are assembled, by inserting the front end of the guide rail into the space, assembling of the guide rail and the front frame can be improved.

BRIEF DESCRIPTION OF THE DRAWINGS

FIG. 7 is a plan view showing the main part of the deflector mechanism according to the embodiment.

DETAILED DESCRIPTION OF THE PREFERRED EMBODIMENT

Figure 1:
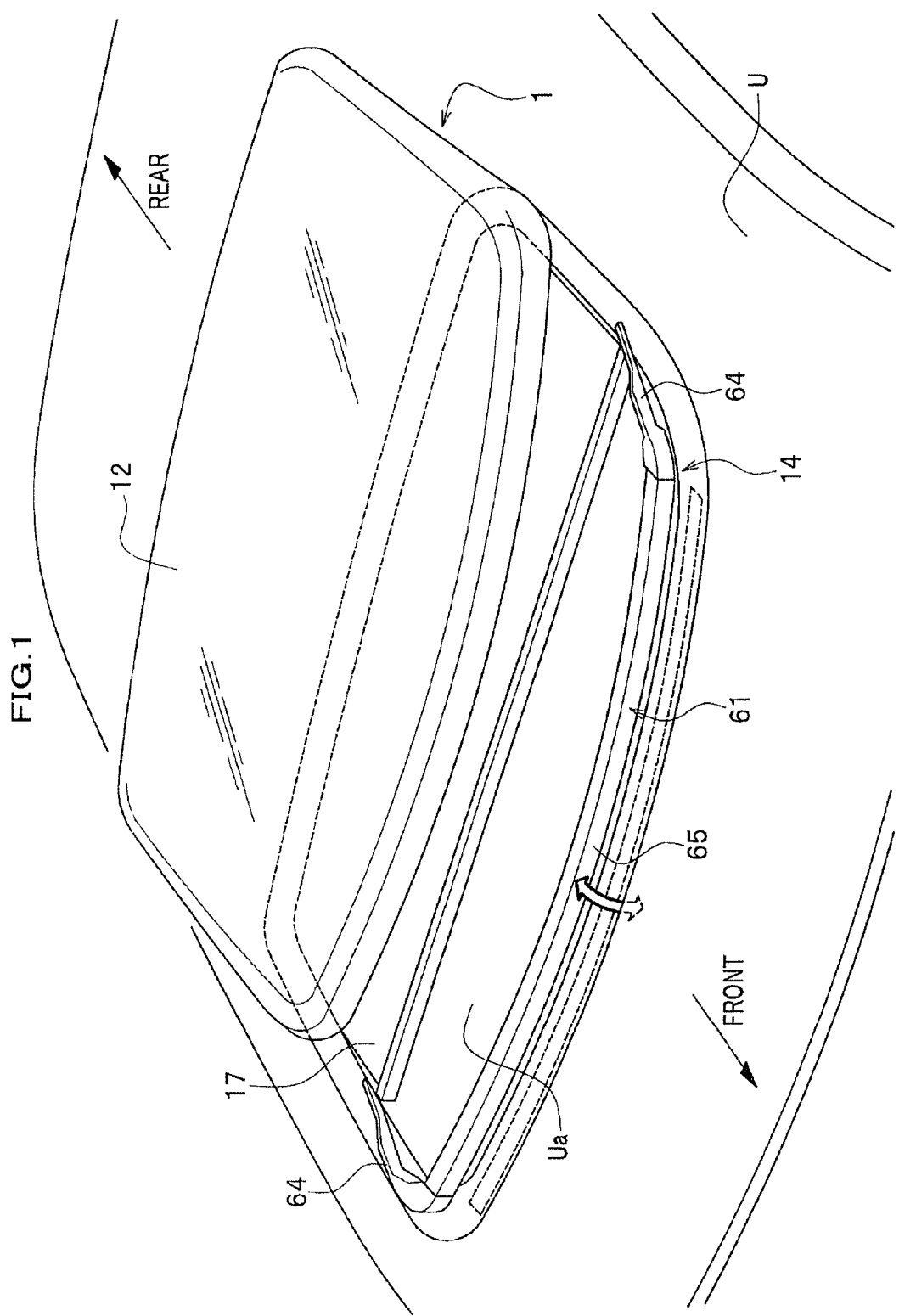
FIG. 1 is a schematic perspective view showing a sunroof apparatus according to an embodiment.

An embodiment of the present invention will be explained in detail with reference to the accompanying drawings. As shown in FIG. 1, a sunroof apparatus 1 according to the embodiment is provided at an opening Ua of a roof U of a vehicle. The top, bottom, right, left, front and back in explanation below coincide with top, bottom, right, left, front and back as viewed from a driver of the vehicle. A pair of members provided right and left and members functionally corresponding to these members are distinguished by adding R and L indicating right and left following the same reference numeral. Regarding a guide rail, for example, a left guide rail will be a guide rail 11L, a right guide rail will be a guide rail 11R, and these will be referred to as guide rails 11 as collective terms. First, the whole configuration and opening/closing operation of the sunroof apparatus 1 will be explained.

Figure 2:
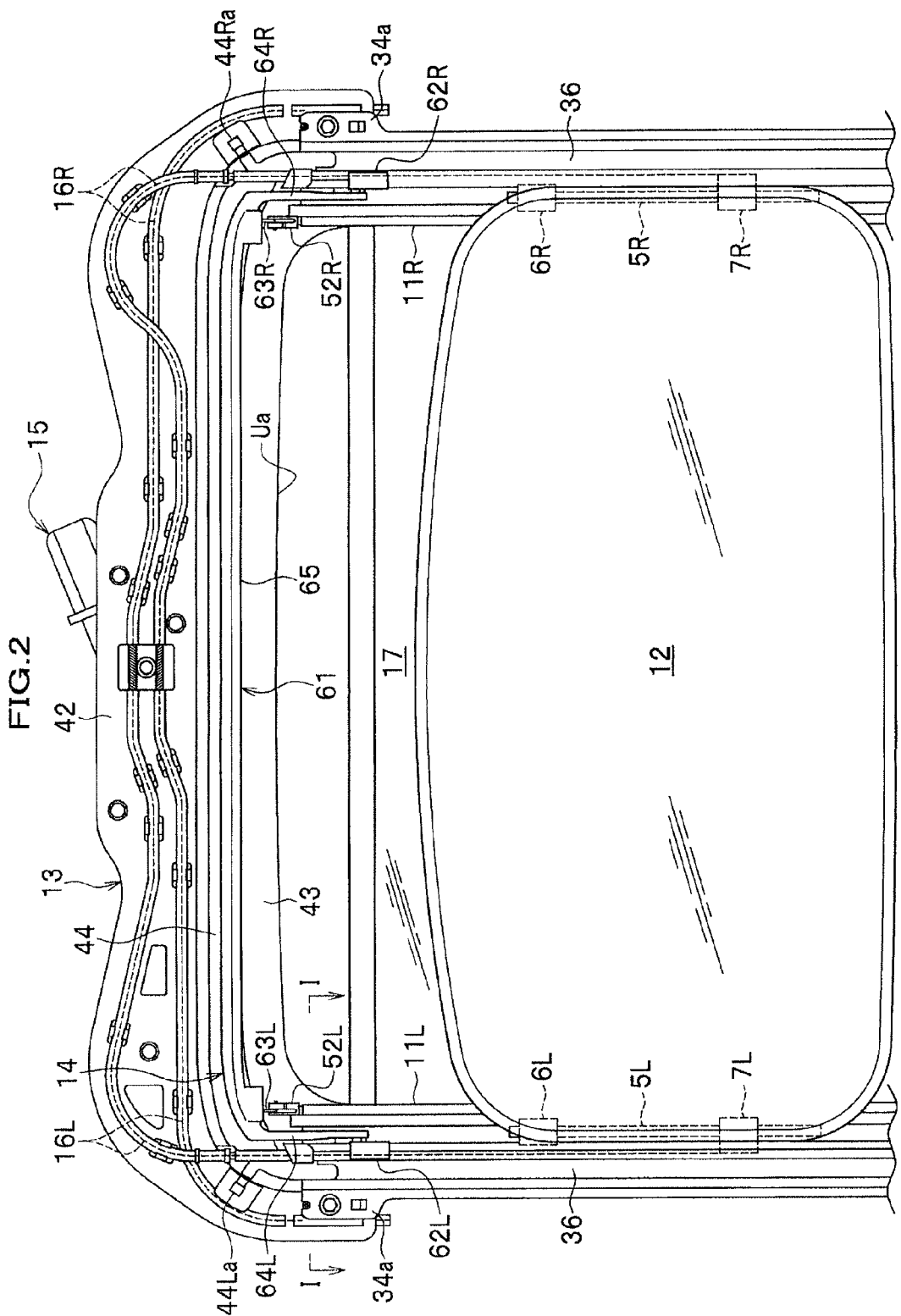
FIG. 2 is a plan view showing the sunroof apparatus according to the embodiment.

As shown in FIGS. 1 and 2, the sunroof apparatus 1 mainly comprises a pair of guide rails 11 (11L, 11R) provided at both sides of the opening Ua in the widthwise direction, a sunroof panel 12 that slides back and forth along the pair of guide rails 11, a front frame 13 that interconnects the front ends of the guide rails 11, a deflector mechanism 14 that ascends/descends along the front edge of the opening of the vehicle, a driving device 15 that drives and opens/closes the sunroof panel 12, a pair of cables 16 (16L, 16R) which link the sunroof panel 12 and the driving device 15, and a sunshade panel 17 provided downwardly of the sunroof panel 12 and sliding back and forth along the guide rails 11.

As shown in FIG. 2, formed at both sides of the sunroof panel 12 are panel brackets 5L, 5R, a pair of right and left front sliders 6L, 6R and a pair of right and left rear sliders 7L, 7R are formed at respective panel brackets 5L, 5R. One end of each cable 16 is linked to a respective rear slider 7. The driving device 15 is equipped with a conventionally well-known motor which is provided so as to mesh with a driven gear provided at the outer circumference of each cable 16. Upon pushing and pulling the cables 16 by the driving device 15, the sunroof panel 12 is moved back and forth to open/close the opening Ua. Also, the sunroof panel 12 is configured so as to tilt up or to tilt down by a conventionally well-known cam mechanism formed at the panel brackets 5. The tilt-up and tilt-down operations of the sunroof panel 12 are same as those of the prior art, so that the explanation thereof will be omitted in this specification.

Figure 3:
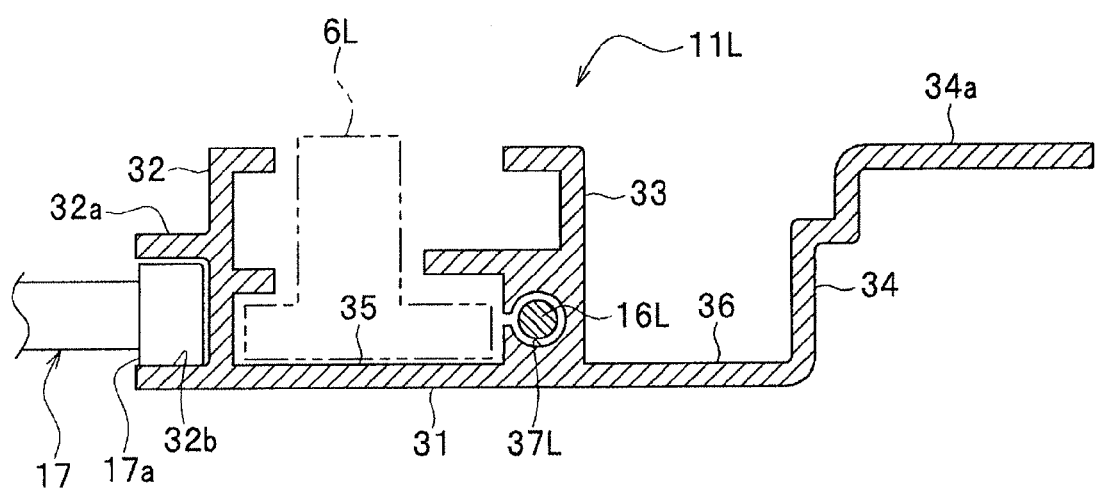
FIG. 3 is a diagram showing a guide rail according to the embodiment, and is a cross-sectional view along a line I-I of FIG. 2.

As shown in FIGS. 2 and 3, the pair of guide rails 11 is provided at both right and left sides of the opening Ua and guides the sunroof panel 12 and the sunshade panel 17 moving back and forth. The guide rails 11 are each formed of an extruded member of an aluminum alloy. Because the guide rails 11 are symmetrical members, the guide rail 11L will be illustrated by an example.

As shown in FIG. 3, the guide rail 11L comprises a bottom 31, an internal side wall portion 32 standing upright from the inner side of the bottom 31 (i.e., the internal side of the vehicle), a center wall portion 33 standing upright at the center of the bottom 31, and an external side wall portion 34 standing upright from the outer side of the bottom 31 (i.e., the external side of the vehicle).

The internal side wall portion 32 has a flared portion 32a protruding toward the internal side of the vehicle and extending back and forth. A sunshade groove 32b is configured by the flared portion 32a, the internal side wall portion 32, and the bottom 31. The sunshade groove 32b is formed so that a sunshade slider 17a of the sunshade panel 17 can slide therethrough. By moving the sunshade panel 17 back and forth manually or electrically, it becomes possible to introduce the sunlight into the vehicle or to block the sunlight.

A guide rail groove 35 is formed between the internal side wall portion 32 and the center wall portion 33. The guide rail groove 35 is formed so that the front slider 6L and the rear slider 7L can slide through the guide rail groove 35. The center wall portion 33 has a cable groove 37L in which the cable 16L is inserted.

An extending portion 34a which protrudes outwardly is formed at the external side wall portion 34. A drainage channel 36 is formed between the external side wall portion 34 and the center wall portion 33. The drainage channel 36 is formed so as to collect rainwater running from the sunroof panel 12 and to let the collected rainwater to flow into a drainage-channel 44 of the front frame 13 to be discussed later.

Figure 4:
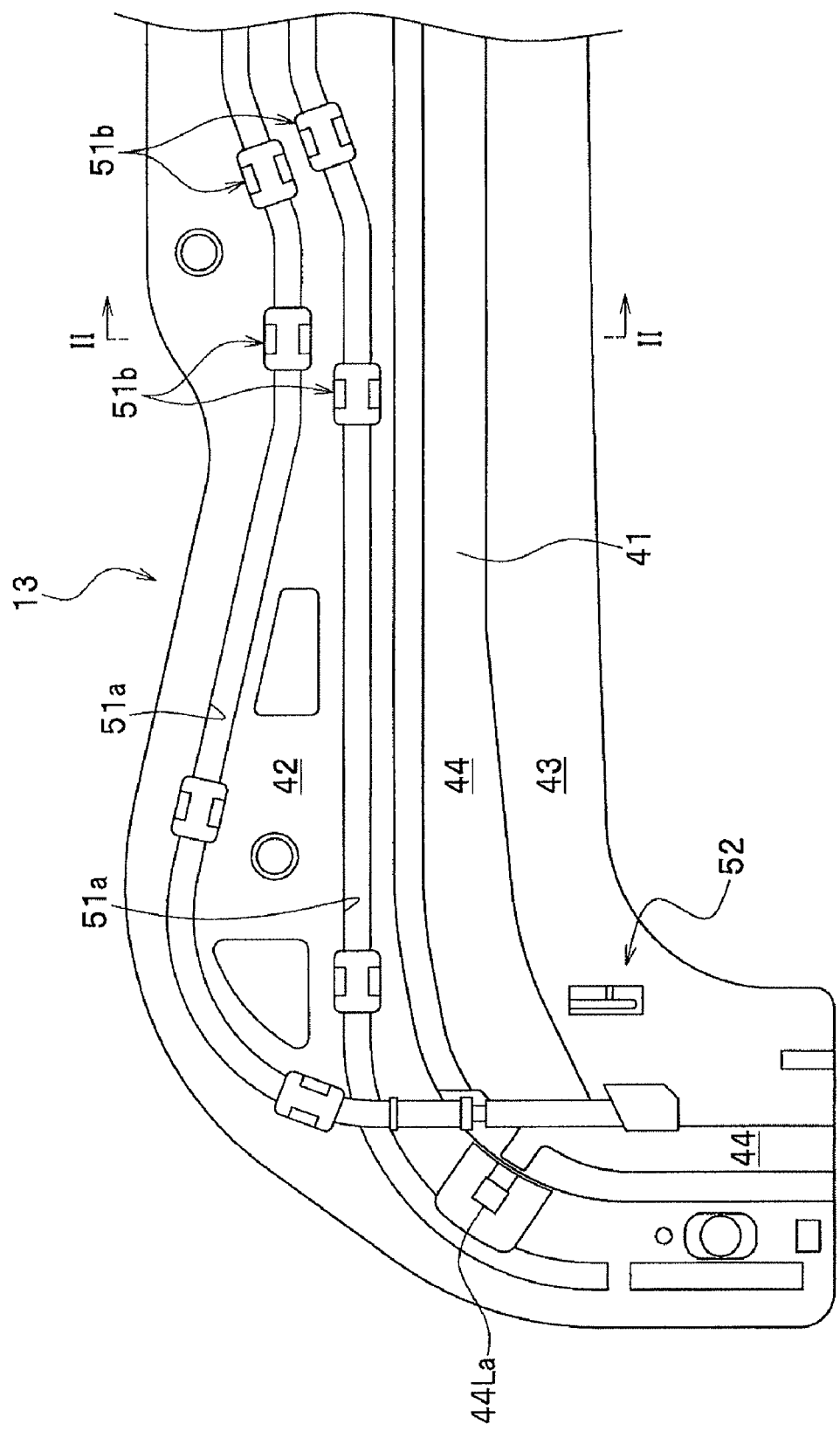
FIG. 4 is a plan view showing a main part of a front frame according to the embodiment.

As shown in FIGS. 2 and 4, the front frame 13 interconnects respective front ends of the guide rails 11L. 11R. The front frame 13 is a tabular member formed in a substantially U-shape in a planer view. Both right and left sides of the front frame 13 are curved and are elongated toward respective guide rails 11. The front frame 13 is made of a resin and is integrally formed by injection molding using a bushing if necessary. Because the front frame 13 is substantially symmetrical other than the arrangements of the cables 16, the left portion will be explained as an example. Note that FIG. 4 is a plan view showing a main part of the front frame according to the embodiment and shows a condition in which no guide pipe that covers the cable 16 is arranged.

Figure 5A:
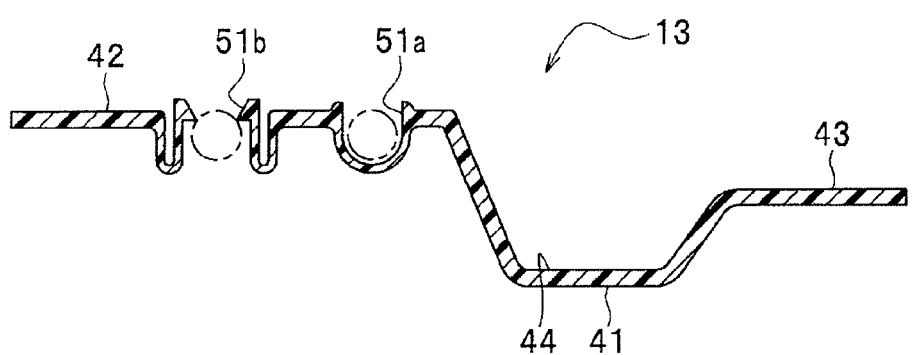
FIG. 5A is a cross-sectional view along a line II-II of FIG. 4.

As shown in FIGS. 4 and 5A, the front frame 13 comprises a bottom plate portion 41, a front tabular portion 42 formed frontward of the bottom plate portion 41, and a rear tabular portion 43 provided backward of the bottom plate portion 41. The bottom plate portion 41 is provided at a position one step lower than the front tabular portion 42 and the rear tabular portion 43. Accordingly, the front frame 13 is formed with the drainage channel 44 having the bottom plate portion 41 serving as the bottom face.

As shown in FIG. 4, the drainage channel 44 extends in the widthwise direction of the front frame 13 and is formed so as to continuously extend in the back and forth direction from the right and left sides of the front frame 13. The drainage channel 44 extending in the back and forth direction is formed so as to be communicated with the drainage channel 36 of the guide rail III, (see FIG. 2). A drainage outlet 44La that is opened to the exterior is provided at the corner portion of the front frame 13, and the drainage collected to the drainage channel 44 is discharged to the exterior from the drainage outlet 44La.

As shown in FIGS. 4 and 5A, the front tabular portion 42 has guide-pipe grooves 51a, 51a in which guide pipes (not shown) those cover the cables 16 are arranged. Also, the front tabular portion has plural hooks 51b for attaching the guide pipes to the front frame 13.

Figure 5B:
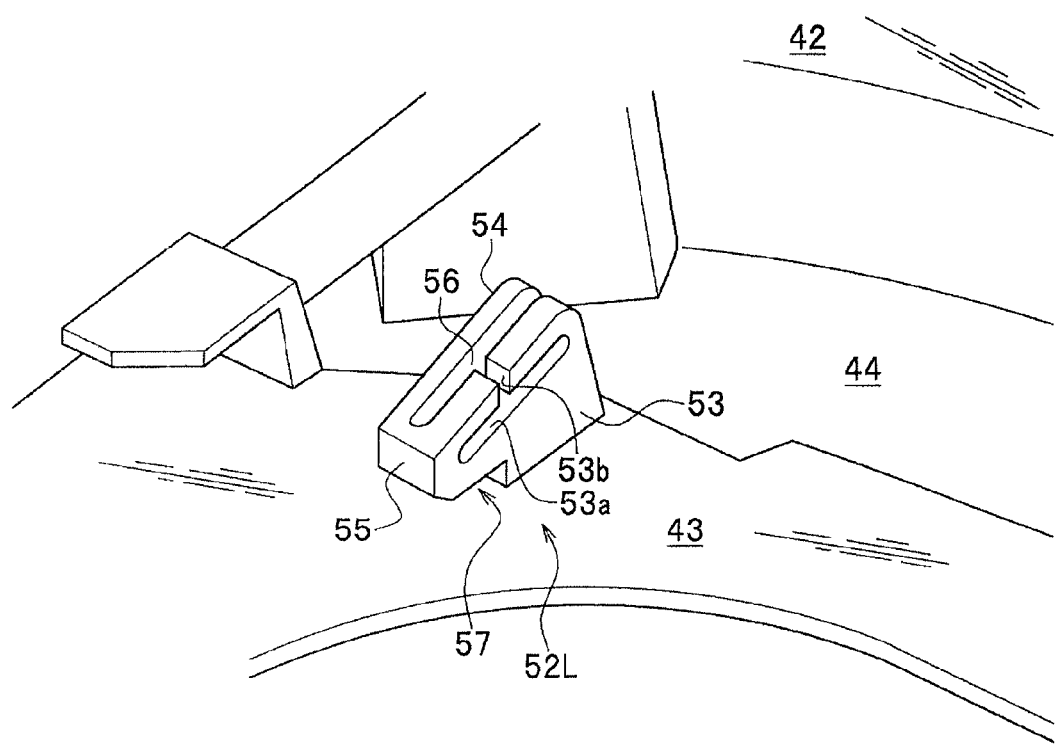
FIG. 5B is a perspective view showing a retainer.

As shown in FIGS. 4 and 5B, the rear tabular portion 43 is integrally formed with a retainer 52L. The retainer 52L is a portion of the deflector mechanism 14. The retainer 52L is formed at the corner portion of the rear tabular portion 43. The retainer 52L comprises a first standing portion 53 and a second standing portion 54 which are provided side by side in the right-and-left direction of the rear tabular portion 43, a rear end 55 that couples the rear end of the first standing portion 53 and the rear end of the second standing portion 54, and a slit 56 formed between the first standing portion 53 and the second standing portion 54.

The first standing portion 53 stands upright on the rear tabular portion 43 and has a long opening 53a that inclines in a front and upward direction and a notch 53b that is communicated with the long opening 53a in the vertical direction. The long opening 53a is a portion with which an urging means 63L to be discussed later engages. The notch 53b is provided in order to introduce the urging means 63L into the long opening 53a.

The second standing portion 54 is formed so as to have the same structure as that of the first standing portion 53 other than having no long opening 53a and notch 53b. The rear end 55 couples the first standing portion 53 and the rear end of the second standing portion 54. The rear end 55 is formed in a rectangular shape as viewed from the back, and is formed in substantially the same shape as that of the opened cross section of the front end of the sunshade groove 32b (see FIG. 3) of the guide rail 11L. The lower portion of the rear end 55 is chamfered.

The slit 56 is a space for allowing the urging means 63L to be discussed later to move in the vertical direction. Formed between the rear end 55 and the rear tabular portion 43 is a space 57 that has a height greater than the thickness of the guide rail 11L.

Figure 6:
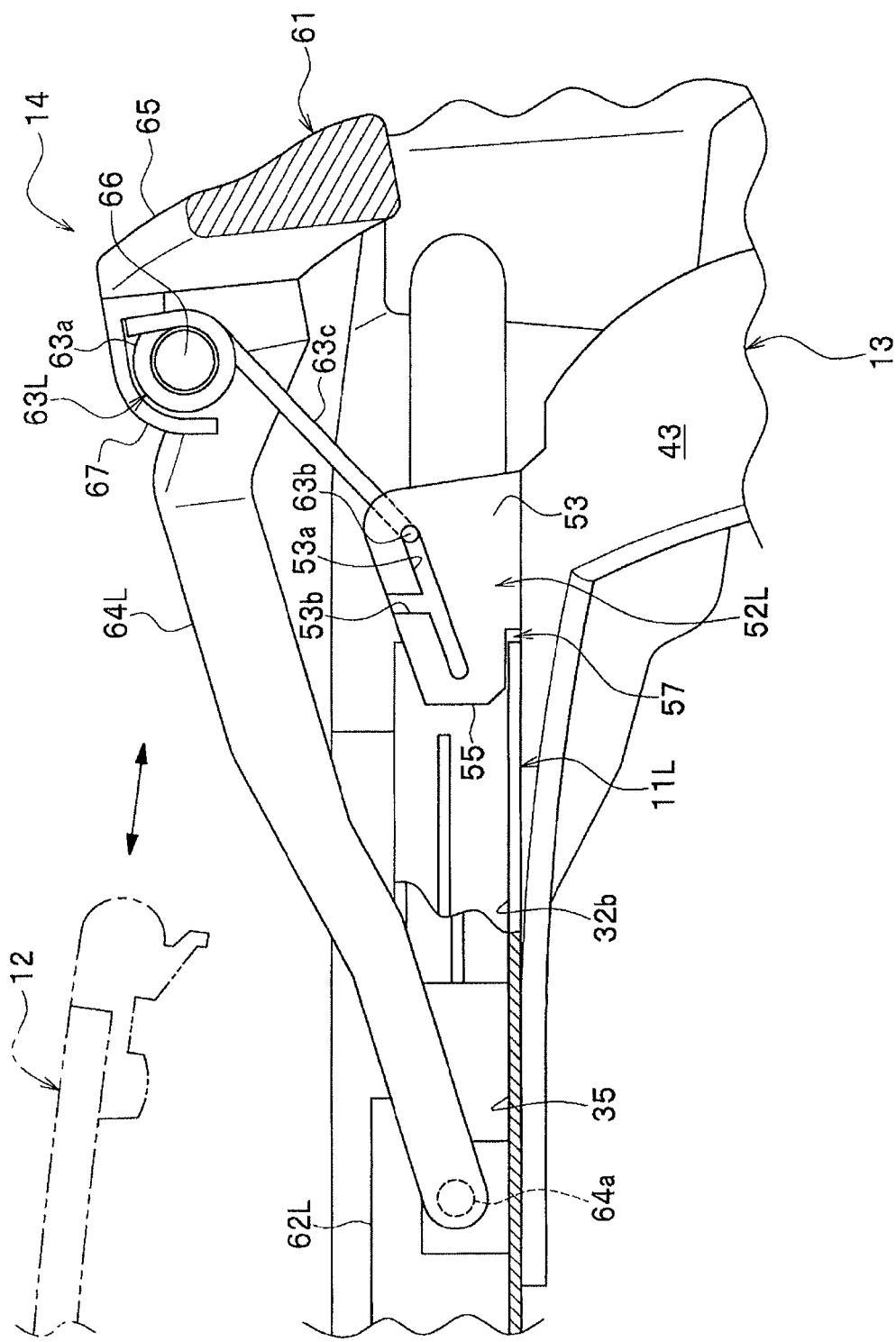
FIG. 6 is a partially-transparent side view showing a deflector mechanism according to the embodiment.

As shown in FIG. 2, after the rear end of the front frame 13 and the front end of the guide rail 111, are superimposed, the front frame 13 is fixed at the extending portion 34a by means of a bolt and a nut. As shown in FIG. 6, when the front frame 13 and the guide rail 11L are assembled, it is preferable to assemble them with the front end of the sunshade groove 32b of the guide rail 11L being inserted into the space 57 formed between the rear end 55 and the rear tabular portion 43. Accordingly, assembling of the front frame 13 with the guide rail 11L can be improved.

As shown in FIGS. 1 and 6, the deflector mechanism 14 comprises a deflector 61 that ascends/descends along the front edge of the opening Ua of the vehicle, support members 62L, 62R that support the basal ends of the deflector 61 through pins, retainers 52L, 52R formed at the front frame 13, and the urging means 63L, 63R that urge the deflector 61 upwardly. Because the deflector mechanism 14 is substantially symmetrical, the left portion thereof will be explained as an example.

The deflector 61 is formed in a U-shape in a plan view along the front edge of the opening Ua. The deflector 61 ascends or descends along with the sliding movement of the sunroof panel 12 in back and forth direction, and suppresses a wind throb. The deflector 61 comprises a pair of arms 64L, 64R and a blade (a current plate) 65 that connects these arms 64 together. Pins 66 which are provided so as to protrude inwardly and which are engaged with the urging means 63L are formed at the right and left ends of the blade 65. Also, covers 67 for covering respective upper spaces of the pins 66 are formed at the right and left ends of the blade 65.

As shown in FIG. 6, the support member 62L is comprised of a bracket that supports a supporting pin 64a formed at the basal end (rear end) of the arm 64L. The support member 62L is fixed to the guide rail groove 35 of the guide rail 11L.

As shown in FIGS. 6 and 7, the urging means 63L is provided across the retainer 52L and the deflector 61 and urges the deflector 61 (the blade 65) upwardly. The urging means 63L is comprised of a coil spring in this embodiment. The urging means 63L comprises a coil 63a engaged with the pin 66 of the deflector 61, a lock portion 63b locked in the long opening 53a of the retainer 52, and a shaft 63c that interconnects the coil 63a and the lock portion 63b. As shown in FIG. 7, the lock portion 63b is formed so as to be vertical to the shaft 63c that is arranged back and forth, and slides in the long opening 53a along with the ascending/descending operation of the deflector 61. When the urging means 63L is assembled, the lock portion 63b is locked in the long opening 53a through the notch 53b of the retainer 52L.

As shown in FIG. 6, when the sunroof panel 12 is opened, the deflector 61 maintains an ascended condition urged by the urging means 63L. In this condition, the lock portion 63b of the urging means 63L is located at the front-end side of the long opening 53a of the retainer 52.

On the other hand, when the sunroof panel 12 is closed, the deflector 61 descends because the panel brackets 5L, 5R formed at the sunroof panel 12 push down the arm 64L against the urging force by the urging means 63. When the sunroof panel 12 is fully closed, the sunroof panel 12 holds down the deflector 61 from the upward direction to the downward direction. In this condition, the lock portion 63b of the urging means 63L is located at the rear end side of the long opening 53a of the retainer 52.

According to the deflector mechanism 14 for the sunroof apparatus of the above-explained embodiment, it is possible to reduce the number of parts because the retainers 52 are formed together with the resin-made front frame 13. It is also possible to eliminate a step of fixing the retainers 52 to the front frame 13 which is necessary in the prior art because the retainers 52 are formed together with the resin-made front frame 13. This enables reduction of the production cost of the sunroof apparatus 1.

Also, according to this embodiment, because the rear ends 55 of the retainers 52 are arranged at respective front ends of the sunshade grooves 32b of the guide rails 11, it is possible for the rear ends 55 of the retainers 52 to serve as a stopper of the sunshade sliders 17a. That is, because the retainers 52 have both functions as the fastener and the stopper, it becomes possible to further reduce the number of parts, etc.

Also, according to this embodiment, assembling of the front frame 13 with the guide rails 11 can be improved by inserting the front end of each guide rail 11 into the space 57 formed between the rear end 55 of the retainer 52 and the rear tabular portion 43 of the front frame 13. Because the lower portion of the rear end 55 is chamfered, the guide rails 11 can be easily introduced to respective spaces 57.

The embodiment of the present invention was explained above, but the invention can be changed and modified as needed within the scope and the spirit of the present invention. For example, according to this embodiment, the urging means 63 was a coil spring, but may be a blade spring or the like. Also, when the rear ends 55 of respective retainers 52 are arranged at respective front ends of the sunshade grooves 32b of the guide rails 11, the guide rails 11 may not abut respective rear ends 55. Also, an intervening member may be provided between each front end of the sunshade groove 32b of the guide rail 11 and each rear end 55 of the retainer 52.

What is claimed is:

1. A deflector mechanism for a sunroof apparatus, the sunroof apparatus comprising:
   a pair of guide rails provided at both sides of an opening formed in a roof of a vehicle in a widthwise direction;
   a sunroof panel which slides back and forth along the pair of guide rails;
   a resin-made front frame which connects respective front ends of the guide rails with each other;
   a pair of sunshade grooves, each of which is formed by one of the pair of guide rails;
   a sunshade which slides back and forth along the pair of sunshade grooves; and
   the deflector mechanism which ascends/descends along a front edge of the opening of the vehicle, wherein
   the deflector mechanism comprises:
     a deflector including a pair of arms and a blade that connects the arms together;
     a pair of support members each of which is formed at each guide rail and which supports a basal end of each arm;
     a retainer formed on the front frame, wherein a rear end of the retainer is arranged at a front end of at least one of the sunshade grooves such that the rear end of the retainer serves as a stopper for the sunshade; and
     an urging means which extends from the deflector to the retainer and which urges the deflector upwardly, and
   the retainer is formed integrally with the front frame.

2. A deflector mechanism for a sunroof apparatus, the sunroof apparatus comprising:

a pair of guide rails provided at both sides of an opening formed in a roof of a vehicle in a widthwise direction;

a sunroof panel which slides back and forth along the pair of guide rails;

a resin-made front frame which connects respective front ends of the guide rails with each other; and the deflector mechanism which ascends/descends along a front edge of the opening of the vehicle, wherein the deflector mechanism comprises:

- a deflector including a pair of arms and a blade that connects the arms together;
- a pair of support members each of which is formed at each guide rail and which supports a basal end of each arm;
- a retainer formed on a rear tabular portion of the front frame, the retainer formed integrally with the front frame; and
- an urging means which extends from the deflector to the retainer and which urges the deflector upwardly, wherein the front end of the guide rail is inserted into a space formed between a rear end of the retainer and the rear tabular portion of the front frame.

3. The deflector mechanism according to claim 2, wherein the rear end of the retainer is arranged so as to face the front end of a groove of the guide rail.

4. The deflector mechanism according to claim 1, wherein the retainer is formed on a rear tabular portion of the front frame, and the front end of the guide rail is inserted into a space formed between the rear end of the retainer and the rear tabular portion of the front frame.

* * * * *